3,039,843
CORROSION INHIBITED WOOD TREATING SOLUTION

Merle D. Chamberlain and Donald V. Todd, Pittsburgh, Pa., assignors to Koppers Company, Inc., a corporation of Delaware
No Drawing. Filed Sept. 15, 1960, Ser. No. 56,123
4 Claims. (Cl. 21—2.5)

This invention relates generally to a composition for the preservation of wood and more particularly to a corrosion inhibited wood treating solution.

Treating wood with creosote (a distillate of coal tar obtained from the high temperature carbonization of bituminous coal and which boils between 200 and 400° C., and which consists principally of liquid and solid aromatic hydrocarbons and contains appreciable quantities of tar acids and tar bases) or with a solution of about 5% pentachlorophenol in a petroleum derivative to protect or preserve the wood is common practice. Usually this treatment consists of applying these materials by painting or spraying onto the wood or by dipping the wood either at atmospheric pressure or under pressure into the material. Various standards for the treatment of wood by these materials have been set up by the American Wood Preservers Association. A typical treatment involves impregnating the wood with the preservative under pressure at temperatures in the range of 175–230° F.

The creosote and the pentachlorophenol are the toxic agents which protect the wood. Neither creosote (when used alone) nor a 5% solution of pentachlorophenol in petroleum presents an appreciable corrosive effect upon the equipment used in the treating process. However, when these two agents are combined as, for example, a solution of pentachlorophenol in creosote, the ordinary steel or iron equipment used in the treating process is subjected to an intensive corrosion action. The reason for this corrosive effect at the high temperature used in the treatment of wood is not known.

It has now been found that the addition of from 0.025–0.1% by weight of phosphoric acid ($H_3PO_4$) to a solution of pentachlorophenol in creosote substantially eliminates the corrosion of equipment by the solution. The additiion of less than 0.025% $H_3PO_4$ does not give a sufficient inhibiting action to the solution for commercial purposes and no great advantage is provided by the addition of more than 0.1%.

Most commercial ortho-phosphoric acids contain about 85% $H_3PO_4$. The phosphoric acid may be added directly to the solution of pentachlorophenol in creosote, but the agitation must be vigorous or a gum-like substance (which is postulated to be due to polymerization of the long chain hydrocarbons present in the creosote) may be produced. Advantageously, the phosphoric acid is diluted, for example, in a ratio of one part of the phosphoric acid, as $H_3PO_4$, to five parts of water as this prevents the formation of gum in the solution even though the mixing with the creosote solution be slow. This dilute phosphoric acid solution increases the water content of the solution of pentachlorophenol in creosote, but the increased water content does not appreciably affect the inhibited characteristics of the solution.

The invention will be illustrated further by the following examples.

EXAMPLE I

A solution was made by dissolving 2% by weight of pentachlorophenol in creosote. Three comparative samples, A, B, and C, were taken of this solution. To sample A was added sufficient ortho-phosphoric acid to give to the solution an inhibitor concentration of 0.1% by weight of $H_3PO_4$; to sample B was added sufficient ortho-phosphoric acid to give to the solution an inhibitor concentration of 0.05% by weight of $H_3PO_4$; and to sample C was added sufficient ortho-phosphoric acid to give to the solution an inhibitor concentration of 0.025% by weight of $H_3PO_4$. As a control a sample D of the original solution of 2% of pentachlorophenol in creosote was taken, a sample E of the original creosote, and a sample F was was prepared by dissolving the pentachlorophenol in kerosene to provide a 5% by weight solution. These samples were subjected to a total immersion test for corrosion as specified in Perry's Chemical Engineering Handbook, pages 1450–1459. Essentially, the test consists of suspending two mild steel test specimens having dimensions of $\frac{1}{16}''$ x $2''$ x $2''$ in the solution being tested (test specimens were suspended on Teflon-wrapped stainless steel bars separated by ceramic spacers to prevent metal to metal contact). After suspending the test specimens in the solution at constant temperature of 235° F. for a period of forty eight hours, the metal test specimen is removed, cleaned, weighed, and the surface area measured. The corrosion rate is calculated from loss of weight, time of exposure, surface area, and density of the metal. The results of the samples of A–F are set out below in Table I.

Table I

| Sample: | Corrosion rate, inches per year |
|---|---|
| A | 0.000 |
| B | 0.000 |
| C | 0.002 |
| D | 0.075 |
| E | 0.000 |
| F | 0.000 |

From this table it can be seen that the corrosion rate of creosote alone is negligible; the corrosion rate of creosote containing 2% pentachlorophenol is great; and that from 0.04–0.1% ortho-phosphoric acid substantially eliminates corrosion in creosote containing 2% of pentachlorophenol.

The temperature of 235° F. was used in the above examples because it was considered to be the highest temperature to which the creosote-2% pentachlorophenol solution would be subjected in the commercial treatment of wood. Also, as is illustrated in Table II, the corrosion rate of a solution of 2% by weight of pentachlorophenol in creosote is negligible at temperature of 165° F., but at higher temperatures such as 235° F. the corrosion rate is substantial.

Table II

CORROSION RATE OF A SOLUTION OF 2% BY WEIGHT OF PENTACHLOROPHENOL CREOSOTE

| Temperature (° F.): | Corrosion rate (inches per year) |
|---|---|
| 165 | 0.000 |
| 188 | 0.002 |
| 206 | 0.004 |
| 223 | 0.060 |
| 235 | 0.075 |

However, as will be seen from Table I above, the addition of the small amount of ortho-phosphoric acid to the solution inhibits it sufficiently that it no longer corrodes the equipment.

The above illustrate the inhibition of a solution of 2% by weight of pentachlorophenol in creosote. This is the concentration which is generally used commercially, for example, for the treatment of telephone poles.

The foregoing has described a composition for the treatment of wood for its preservation, which composition does not appreciably corrode the equipment used in the treatment. In accordance with this invention, the addition of a small amount of ortho-phosphoric acid to a solution of pentachlorophenol in creosote substantially mitigates the corrosive effect of the solution on the equipment used in the treatment of the wood with the solution.

We claim:
1. A method of inhibiting the corrosive action of a solution of pentachlorophenol in creosote which comprises adding to the solution an effective amount of ortho-phosphoric acid as corrosion inhibitor.
2. An inhibited solution for the treatment of wood which consists essentially of about 2 parts by weight of pentachlorophenol dissolved in 98 parts by weight of creosote to which is added about 0.025–0.1% by weight of ortho-phosphoric acid.
3. A composition for the preservation of wood which has an inhibited corrosive effect on metal which comprises a solution of from 1–5% of pentachlorophenol in creosote and from 0.025–0.1% of ortho-phosphoric acid.
4. The method of inhibiting the corrosive action of a solution of 1–5% of pentachlorophenol in creosote which comprises adding from 0.025–0.1% of ortho-phosphoric acid thereto.

References Cited in the file of this patent
UNITED STATES PATENTS

| | | |
|---|---|---|
| 2,304,013 | Norton | Dec. 1, 1942 |
| 2,784,139 | Cutler | Mar. 5, 1957 |

FOREIGN PATENTS

| | | |
|---|---|---|
| 190,074 | Great Britain | Dec. 14, 1922 |

OTHER REFERENCES

Uhlig: Corrosion Handbook, pp. 867–868, pub. John Wiley and Sons, Inc., N.Y., 1948.

Weiss: Preservatory Structural Timber, p. 68, pub. McGraw-Hill Book Co., Inc., N.Y., 1916.